United States Patent
Shi et al.

(10) Patent No.: US 10,554,342 B2
(45) Date of Patent: *Feb. 4, 2020

(54) METHOD AND DEVICE FOR CONTROLLING SENDING OF GTP MESSAGE, AND DATA SENDING METHOD AND DEVICE

(71) Applicant: Huawei Technologies Co., Ltd., Shenzhen (CN)

(72) Inventors: Xiaoyan Shi, Shenzhen (CN); Wanqiang Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/298,828

(22) Filed: Mar. 11, 2019

(65) Prior Publication Data
US 2019/0207717 A1    Jul. 4, 2019

Related U.S. Application Data

(63) Continuation of application No. 14/990,599, filed on Jan. 7, 2016, now Pat. No. 10,270,561, which is a
(Continued)

(51) Int. Cl.
*H04L 1/16* (2006.01)
*H04W 76/25* (2018.01)
*H04L 1/18* (2006.01)

(52) U.S. Cl.
CPC .......... *H04L 1/1678* (2013.01); *H04L 1/1887* (2013.01); *H04W 76/25* (2018.02); *H04L 1/1848* (2013.01)

(58) Field of Classification Search
None
See application file for complete search history.

(56) References Cited

U.S. PATENT DOCUMENTS

| 2011/0212742 A1* | 9/2011 | Chen ............. | H04W 52/0206 455/507 |
| 2013/0128744 A1* | 5/2013 | Landais .......... | H04W 28/0221 370/236 |

(Continued)

FOREIGN PATENT DOCUMENTS

| CN | 101370283 A | 2/2009 |
| CN | 101998670 A | 3/2011 |

(Continued)

OTHER PUBLICATIONS

"PDN GW Initiated Dedicated Bearer Management for EMM_IDLE UE," 3GPP TSG SA WG2 Meeting #61, Ljubljana, Slovenia, TD S2-074963, pp. 1-6, 3rd Generation Partnership Project, Valbonne, France (Nov. 12-16, 2007).

(Continued)

*Primary Examiner* — Mohammad S Adhami
(74) *Attorney, Agent, or Firm* — Leydig, Voit & Mayer, Ltd.

(57) ABSTRACT

A method and device for controlling sending of a general data transfer platform (GTP) message, and a data sending method and device are provided. A GTP message sending device receives a no-response time indication of user equipment sent from a GTP message response device, where the no-response time indication indicates a no-response time of the user equipment in an implicit or explicit manner, the GTP message sending device adjusts, according to the no-response time of the user equipment indicated by the received no-response time indication of the user equipment, a time of sending a GTP message, where adjusting the time of sending the GTP message is specifically postponing the time of sending the GTP message as the no-response time of the user equipment increases, or bringing forward the time
(Continued)

of sending the GTP message as the no-response time of the user equipment decreases.

15 Claims, 7 Drawing Sheets

Related U.S. Application Data continuation of application No. PCT/CN2013/079001, filed on Jul. 8, 2013.

(56) References Cited

U.S. PATENT DOCUMENTS

| | | | |
|---|---|---|---|
| 2013/0128788 A1 | 5/2013 | Guey et al. | |
| 2013/0155954 A1 | 6/2013 | Wang et al. | |
| 2014/0092799 A1 | 4/2014 | Jain et al. | |
| 2014/0133459 A1 | 5/2014 | Zhang et al. | |
| 2014/0247765 A1* | 9/2014 | Baghel | H04W 52/0203 370/311 |
| 2015/0003312 A1* | 1/2015 | Jeong | H04W 52/0235 370/311 |
| 2015/0109898 A1* | 4/2015 | Wang | H04W 24/04 370/216 |
| 2015/0109986 A1 | 4/2015 | Siomina et al. | |
| 2015/0117284 A1 | 4/2015 | Baldemair et al. | |
| 2016/0057044 A1* | 2/2016 | Koc | H04W 52/0209 370/311 |

FOREIGN PATENT DOCUMENTS

| | | |
|---|---|---|
| EP | 2814289 A1 | 12/2014 |
| KR | 20050029381 A | 3/2005 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, V12.1.0, pp. 1-291, 3rd Generation Partnership Project, Valbonne, France (Jun. 2013).

"3rd Generation Partnership Project; Technical Specification Group Services and System Aspects; Machine-Type and other Mobile Data Applications Communications Enhancements (Release 12)," 3GPP TR23.887, V1 .0.0, pp. 1-133, 3rd Generation Partnership Project, Valbonne, France (Jun. 2013).

"3rd Generation Partnership Project; Technical Specification Group Core Network and Terminals; Policy and Charging Control (PCC); Reference points (Release 12)," 3GPP TS29.212, V12.1.0, pp. 1-200, 3rd Generation Partnership Project, Valbonne, France (Jun. 2013).

"3rd Generation Partnership Project; Technical Specification Group Core Network and Terminals; 3GPP Evolved packet System (EPS); Evolved General Packet Radio Service (GPRS) Tunnelling Protocol for Control plane (GTPv2-C); Stage 3 (Release 12)," 3GPP TS 29.274, V12.1.0, pp. 1-228, 3rd Generation Partnership Project, Valbonne, France (Jun. 2013).

"MME overload control by throttling of DL low priority traffic," 3GPP TSG SA WG2 Meeting #82, Jacksonville, Florida, S2-105545, 3rd Generation Partnership Project, Valbonne, France (Nov. 15-19, 2010).

"Evaluation of long DRX," SA WG2 Meeting #S2-97, Busan, South Korea, S2-132136, 3rd Generation Partnership Project, Valbonne, France (May 27-31, 2013).

* cited by examiner

```
┌─────────────────────────────────────────────────────────┐
│ A GTP message sending device receives a no-response      │
│ time indication of user equipment sent by a GTP message  │──── S110
│ response device, where the no-response time indicates    │
│ the no-response time of the user equipment in an         │
│ implicit or explicit manner                              │
└─────────────────────────────────────────────────────────┘
                             │
                             ▼
┌─────────────────────────────────────────────────────────┐
│ The GTP message sending device adjusts, according to     │
│ the no-response time of the user equipment indicated by  │
│ the received no-response time indication of the user     │
│ equipment, a time of sending a GTP message, where        │──── S111
│ adjusting the time of sending the GTP message is         │
│ specifically postponing the time of sending the GTP      │
│ message as the no-response time of the user equipment    │
│ increases, or bringing forward the time of sending the   │
│ GTP message as the no-response time of the user          │
│ equipment decreases                                      │
└─────────────────────────────────────────────────────────┘
```

FIG. 1

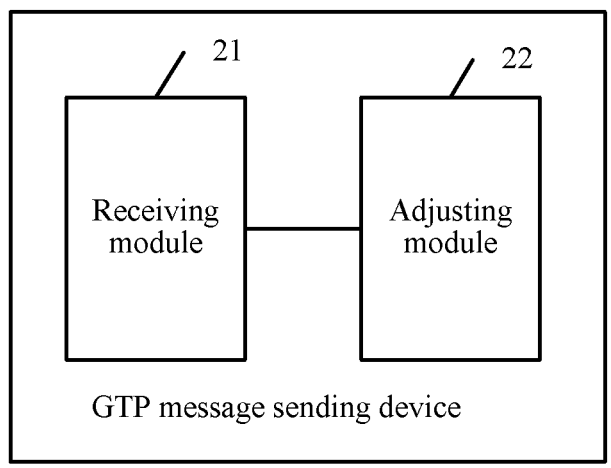

FIG. 2

METHOD AND DEVICE FOR CONTROLLING SENDING OF GTP MESSAGE, AND DATA SENDING METHOD AND DEVICE

CROSS-REFERENCE TO RELATED APPLICATIONS

This application is a continuation of U.S. patent application Ser. No. 14/990,599, filed on Jan. 7, 2016, which is a continuation of International Patent Application No. PCT/CN2013/079001, filed on Jul. 8, 2013. All of the aforementioned patent applications are hereby incorporated by reference in their entireties.

TECHNICAL FIELD

Embodiments of the disclosure relate to a field of communications electronics, and in particular, to a method and device for controlling sending of a general data transfer platform (GTP) message, and a data sending method and device.

BACKGROUND

A create session request message and a create session response message in an attach procedure of user equipment, and a create bearer request message and a create bearer reply message in a dedicated bearer activation procedure are all general data transfer platform (GTP) messages (where GTP messages further include an update bearer request and response, a delete bearer request and response, and the like). For a GTP message, a message retransmission mechanism is used to ensure transmission reliability of the message, that is, after sending a GTP message (such as a create bearer request), a GTP message sending device starts a retransmission timer (whose duration is T3-RESPONSE), and when the retransmission timer expires, if the GTP message sending device does not receive a corresponding response message (such as a create bearer response), the GTP message sending device retransmits the GTP message, and starts a retransmission counter to record a quantity of times of retransmissions. When the quantity of times of retransmissions is greater than N3-REQUESTS, the GTP message sending device considers that a path fault occurs, records information about the fault, and deletes a corresponding user/bearer context or initiates a device recovery procedure (for example, when the GTP message sending device is a serving gateway (S-GW), a current S-GW of user equipment is changed). T3-RESPONSE and N3-REQUESTS may be configured on the GTP message sending device.

Currently, to save electricity of user equipment, when the user equipment is in an idle state, discontinuous reception (DRX) is used, so as to reduce consumption of electricity. Each paging frame is one radio frame, and may include multiple paging occasions. When the DRX is used, the user equipment needs to listen to only one paging occasion in each DRX period, thereby achieving the purpose of saving electricity of the user equipment.

Another electricity saving manner is that user equipment enters an electricity saving state, and in this state, a user no longer listens to any signaling sent from a network side; after learning that the user equipment enters the electricity saving state, an MME no longer attempts to page the user equipment, and the MME does not start paging the user equipment until the user equipment exits the electricity saving state. The MME and the user equipment may determine, by means of configuration or signaling interaction, specific times at which the user equipment enters the electricity saving state and exits the state.

In the foregoing prior art, when the DRX period is set to be a relatively long time, or when the user equipment stays in the electricity saving state for a long time, it is caused that the UE does not respond to paging within a relatively long time. In such a case, if the initiated paging is caused by reception of a GTP message (for example, in a bearer activation procedure of an evolved packet system (EPS) radio network architecture, if user equipment is in an idle state, after receiving a create bearer request, a mobility management entity (MME) triggers a procedure of paging the user equipment), it is caused that a paging device does not send a GTP response message within a long time (because the MME does not send a response message to an S-GW until a service request procedure is ended); in this case, if a packet data network gateway (P-GW) that sends the create bearer request does not receive a response message in a long time, the packet data network gateway retransmits the corresponding create bearer request message, until a count of a retransmission counter exceeds N3-REQUESTS, and then deletes a corresponding user/bearer context or initiates a node recovery procedure. In this case, when a no-response time of a user, such as a set DRX time or a time in which user equipment stays in an electricity saving state, is excessively long, a service interruption of the user equipment is caused or an unnecessary device recovery procedure is caused, leading to signaling overload of a network.

SUMMARY

Embodiments of the disclosure provide a method for controlling sending of a GTP message, a data sending method, a GTP message sending device, and a GTP message response device, which avoid a service interruption of user equipment or an unnecessary device recovery procedure on a network caused by an excessively long no-response time of a user.

A first aspect of the embodiments of the disclosure provides a method for controlling sending of a GTP message, including: receiving, by a GTP message sending device, a no-response time indication of user equipment sent from a GTP message response device, where the no-response time indication indicates a no-response time of the user equipment in an implicit or explicit manner; and adjusting, by the GTP message sending device according to the no-response time of the user equipment indicated by the received no-response time indication of the user equipment, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases.

With reference to the first aspect, in a first possible implementation manner, the adjusting, by the GTP message sending device according to the no-response time of the user equipment indicated by the received no-response time indication of the user equipment, a time of sending a GTP message includes any one of the following manners.

Manner 1: adjusting, by the GTP message sending device, duration of a retransmission timer to be greater than duration of the no-response time of the user equipment, where the duration of the retransmission timer is duration of retransmission of the GTP message performed by the GTP message sending device.

Manner 2: adjusting, by the GTP message sending device, a product of duration of a retransmission timer and a quantity-of-times threshold of a retransmission counter to be greater than duration of the no-response time of the user equipment.

Manner 3: stopping, by the GTP message sending device, retransmission of the GTP message.

Manner 4: before the no-response time of the user equipment is ended, stopping, by the GTP message sending device, sending the GTP message.

With reference to the first aspect or the first possible implementation manner of the first aspect, in a second possible implementation manner, the receiving, by a GTP message sending device, a no-response time indication of user equipment sent from a GTP message response device includes: receiving, by the GTP message sending device, a create session request message sent from the GTP message response device, where the create session request message carries the no-response time indication of the user equipment; or receiving, by the GTP message sending device, a bearer response message sent from the GTP message response device, where the bearer response message carries the no-response time indication of the user equipment, and the bearer response message includes at least one of a create bearer response message, a bearer modification response message, a bearer deactivation response message, and a delete bearer response message; or receiving, by the GTP message sending device, a downlink data notification acknowledgment message sent from the GTP message response device, where the downlink data notification acknowledgment message carries the no-response time indication of the user equipment.

With reference to the second possible implementation manner of the first aspect, in a third possible implementation manner, the GTP message sending device includes a packet data network gateway (P-GW), and the GTP message response device includes a serving gateway (S-GW); or the GTP message sending device includes a serving gateway (S-GW), and the GTP message response device includes a mobility management entity (MME).

With reference to the first aspect or the first possible implementation manner of the first aspect, in a fourth possible implementation manner, the receiving, by a GTP message sending device, a no-response time indication of user equipment sent from a GTP message response device includes: receiving, by the GTP message sending device, a create packet data protocol context request message sent from the GTP message response device, where the create packet data protocol context request message carries the no-response time indication of the user equipment; or receiving, by the GTP message sending device, a packet data protocol context response message sent from the GTP message response device, where the packet data protocol context response message carries the no-response time indication of the user equipment, and the packet data protocol context response message includes at least one of an update packet data protocol context response message and a delete packet data protocol context response message.

With reference to the fourth possible implementation manner of the first aspect, in a fifth possible implementation manner, the GTP message sending device includes a gateway general packet radio service (GPRS) support node (GGSN), and the GTP message response device includes a service GPRS support node (SGSN).

With reference to any one of the first aspect and the first to the fifth possible implementation manners of the first aspect, in a sixth possible implementation manner, the no-response time of the user equipment includes a no-response time span or an end time of a no-response state.

A second aspect of the embodiments of the disclosure provides a data sending method, where the method may include: acquiring, by a GTP message response device, a no-response time of user equipment; and sending, by the GTP message response device, the acquired no-response time indication of the user equipment to a GTP message sending device, where the no-response time indication indicates a no-response time of the user equipment in an implicit or explicit manner, so that the GTP message sending device adjusts, according to the no-response time of the user equipment indicated by the received no-response time indication of the user equipment, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases.

With reference to the second aspect, in a first possible implementation manner, the sending, by the GTP message response device, the acquired no-response time indication of the user equipment to a GTP message sending device includes: sending, by the GTP message response device, a create session request message to the GTP message sending device, where the create session request message carries the no-response time indication of the user equipment; or sending, by the GTP message response device, a bearer response message to the GTP message sending device, where the bearer response message carries the no-response time indication of the user equipment, and the bearer response message includes at least one of a create bearer response message, a bearer modification response message, a bearer deactivation response message, and a delete bearer response message; or sending, by the GTP message response device, a downlink data notification acknowledgment message to the GTP message sending device, where the downlink data notification acknowledgment message carries the no-response time indication of the user equipment.

With reference to the first possible implementation manner of the second aspect, in a second possible implementation manner, the GTP message sending device includes a packet data network gateway (P-GW), and the GTP message response device includes a serving gateway (S-GW); or the GTP message sending device includes a serving gateway (S-GW), and the GTP message response device includes a mobility management entity (MME).

With reference to the second aspect, in a third possible implementation manner, the sending, by the GTP message response device, the acquired no-response time indication of the user equipment to a GTP message sending device includes: sending, by the GTP message response device, a create packet data protocol context request message to the GTP message sending device, where the create packet data protocol context request message carries the no-response time indication of the user equipment; or sending, by the GTP message response device, a packet data protocol context response message to the GTP message sending device, where the packet data protocol context response message carries the no-response time indication of the user equipment, and the packet data protocol context response message includes at least one of an update packet data protocol context response message and a delete packet data protocol context response message.

With reference to the third possible implementation manner of the second aspect, in a fourth possible implementation manner, the GTP message sending device includes a gateway GPRS support node (GGSN), and the GTP message response device includes a service GPRS support node (SGSN).

A third aspect of the embodiments of the disclosure provides a GTP message sending device, where the device may include: a receiving module, configured to receive a no-response time indication of user equipment sent from a GTP message response device, where the no-response time indication indicates a no-response time of the user equipment in an implicit or explicit manner; and an adjusting module, configured to adjust, according to the no-response time of the user equipment indicated by the no-response time indication of the user equipment received by the receiving module, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases.

With reference to the third aspect, in a first possible implementation manner, the adjusting module includes at least one of the following modules: a first adjusting module, configured to adjust duration of a retransmission timer to be greater than duration of the no-response time of the user equipment, where the duration of the retransmission timer is duration of retransmission of the GTP message performed by the GTP message sending device; a second adjusting module, configured to adjust a product of duration of a retransmission timer and a quantity-of-times threshold of a retransmission counter to be greater than duration of the no-response time of the user equipment; a third adjusting module, configured to stop retransmission of the GTP message; and a fourth adjusting module, configured to: before the no-response time of the user equipment is ended, stop sending the GTP message.

With reference to the third aspect or the first possible implementation manner of the third aspect, in a second possible implementation manner, the receiving module is specifically configured to receive a create session request message sent from the GTP message response device, where the create session request message carries the no-response time indication of the user equipment; or receive a bearer response message sent from the GTP message response device, where the bearer response message carries the no-response time indication of the user equipment, and the bearer response message includes at least one of a create bearer response message, a bearer modification response message, a bearer deactivation response message, and a delete bearer response message; or receive a downlink data notification acknowledgment message sent from the GTP message response device, where the downlink data notification acknowledgment message carries the no-response time indication of the user equipment.

With reference to the second possible implementation manner of the third aspect, in a third possible implementation manner, the GTP message sending device includes a packet data network gateway (P-GW), and the GTP message response device includes a serving gateway (S-GW); or the GTP message sending device includes a serving gateway (S-GW), and the GTP message response device includes a mobility management entity (MME).

With reference to the third aspect or the first possible implementation manner of the third aspect, in a fourth possible implementation manner, the receiving module is specifically configured to receive a create packet data protocol context request message sent from the GTP message response device, where the create packet data protocol context request message carries the no-response time indication of the user equipment; or receive a packet data protocol context response message sent from the GTP message response device, where the packet data protocol context response message carries the no-response time indication of the user equipment, and the packet data protocol context response message includes at least one of an update packet data protocol context response message and a delete packet data protocol context response message.

With reference to the fourth possible implementation manner of the third aspect, in a fifth possible implementation manner, the GTP message sending device includes a gateway GPRS support node (GGSN), and the GTP message response device includes a service GPRS support node (SGSN).

With reference to any one of the third aspect and the first to the fifth possible implementation manners of the third aspect, in a sixth possible implementation manner, the no-response time of the user equipment includes a no-response time span or an end time of a no-response state.

A fourth aspect of the embodiments of the disclosure provides a GTP message response device, including: an acquiring module, configured to acquire a no-response time indication of user equipment; and a sending module, configured to send the acquired no-response time indication of the user equipment to a GTP message sending device, where the no-response time indication indicates a no-response time of the user equipment in an implicit or explicit manner, so that the GTP message sending device adjusts, according to the no-response time of the user equipment indicated by the received no-response time indication of the user equipment, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases.

With reference to the fourth aspect, in a first possible implementation manner, the sending module is specifically configured to send a create session request message to the GTP message sending device, where the create session request message carries the no-response time indication of the user equipment; or send a bearer response message to the GTP message sending device, where the bearer response message carries the no-response time indication of the user equipment, and the bearer response message includes at least one of a create bearer response message, a bearer modification response message, a bearer deactivation response message, and a delete bearer response message; or send a downlink data notification acknowledgment message to the GTP message sending device, where the downlink data notification acknowledgment message carries the no-response time indication of the user equipment.

With reference to the first possible implementation manner of the fourth aspect, in a second possible implementation manner, the GTP message sending device includes a packet data network gateway (P-GW), and the GTP message response device includes a serving gateway (S-GW); or the GTP message sending device includes a serving gateway (S-GW), and the GTP message response device includes a mobility management entity (MME).

With reference to the fourth aspect, in a third possible implementation manner, the sending module is specifically configured to send a create packet data protocol context request message to the GTP message sending device, where the create packet data protocol context request message carries the no-response time indication of the user equipment; or send a packet data protocol context response message to the GTP message sending device, where the packet data protocol context response message carries the no-response time indication of the user equipment, and the packet data protocol context response message includes at least one of an update packet data protocol context response message and a delete packet data protocol context response message.

With reference to the third possible implementation manner of the fourth aspect, in a fourth possible implementation manner, the GTP message sending device includes a gateway GPRS support node (GGSN), and the GTP message response device includes a service GPRS support node (SGSN).

A fifth aspect of the embodiments of the disclosure provides a GTP message sending device, which may include: a receiver, configured to receive a no-response time indication of user equipment sent from a GTP message response device, where the no-response time indication indicates a no-response time of the user equipment in an implicit or explicit manner; and a processor, configured to adjust, according to the no-response time of the user equipment indicated by the no-response time indication of the user equipment received by the receiver, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases.

With reference to the fifth aspect, in a first possible implementation manner, the processor is specifically configured to perform any one of the following operations: adjusting duration of a retransmission timer to be greater than duration of the no-response time of the user equipment, where the duration of the retransmission timer is duration of retransmission of the GTP message performed by the GTP message sending device; adjusting a product of duration of a retransmission timer and a quantity-of-times threshold of a retransmission counter to be greater than duration of the no-response time of the user equipment; stopping retransmission of the GTP message; and before the no-response time of the user equipment is ended, stopping sending the GTP message.

With reference to the fifth aspect or the first possible implementation manner of the fifth aspect, in a second possible implementation manner, the receiver is specifically configured to receive a create session request message sent from the GTP message response device, where the create session request message carries the no-response time indication of the user equipment; or receive a bearer response message sent from the GTP message response device, where the bearer response message carries the no-response time indication of the user equipment, and the bearer response message includes at least one of a create bearer response message, a bearer modification response message, a bearer deactivation response message, and a delete bearer response message; or receive a downlink data notification acknowledgment message sent from the GTP message response device, where the downlink data notification acknowledgment message carries the no-response time indication of the user equipment.

With reference to the second possible implementation manner of the fifth aspect, in a third possible implementation manner, the GTP message sending device includes a packet data network gateway (P-GW), and the GTP message response device includes a serving gateway (S-GW); or the GTP message sending device includes a serving gateway (S-GW), and the GTP message response device includes a mobility management entity (MME).

With reference to the fifth aspect or the first possible implementation manner of the fifth aspect, in a fourth possible implementation manner, the receiver is specifically configured to receive a create packet data protocol context request message sent from the GTP message response device, where the create packet data protocol context request message carries the no-response time indication of the user equipment; or receive a packet data protocol context response message sent from the GTP message response device, where the packet data protocol context response message carries the no-response time indication of the user equipment, and the packet data protocol context response message includes at least one of an update packet data protocol context response message and a delete packet data protocol context response message.

With reference to the fourth possible implementation manner of the fifth aspect, in a fifth possible implementation manner, the GTP message sending device includes a gateway GPRS support node (GGSN), and the GTP message response device includes a service GPRS support node (SGSN).

With reference to any one of the fifth aspect and the first to the fifth possible implementation manners of the fifth aspect, in a sixth possible implementation manner, the no-response time of the user equipment includes a no-response time span or an end time of a no-response state.

A sixth aspect of the embodiments of the disclosure provides a GTP message response device, which may include: a receiver, configured to acquire a no-response time indication of user equipment; and a transmitter, configured to send the no-response time indication of the user equipment acquired by the receiver to a GTP message sending device, where the no-response time indication indicates a no-response time of the user equipment in an implicit or explicit manner, so that the GTP message sending device adjusts, according to the no-response time of the user equipment indicated by the received no-response time indication of the user equipment, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases.

With reference to the sixth aspect, in a first possible implementation manner, the transmitter is specifically configured to send a create session request message to the GTP message sending device, where the create session request message carries the no-response time indication of the user equipment; or send a bearer response message to the GTP message sending device, where the bearer response message carries the no-response time indication of the user equipment, and the bearer response message includes at least one of a create bearer response message, a bearer modification response message, a bearer deactivation response message, and a delete bearer response message; or send a downlink data notification acknowledgment message to the GTP message sending device, where the downlink data notification acknowledgment message carries the no-response time indication of the user equipment.

With reference to the first possible implementation manner of the sixth aspect, in a second possible implementation manner, the GTP message sending device includes a packet data network gateway (P-GW), and the GTP message response device includes a serving gateway (S-GW); or the GTP message sending device includes a serving gateway (S-GW), and the GTP message response device includes a mobility management entity (MME).

With reference to the sixth aspect, in a third possible implementation manner, the transmitter is specifically configured to send a create packet data protocol context request message to the GTP message sending device, where the create packet data protocol context request message carries the no-response time indication of the user equipment; or send a packet data protocol context response message to the GTP message sending device, where the packet data protocol context response message carries the no-response time indication of the user equipment, and the packet data protocol context response message includes at least one of an update packet data protocol context response message and a delete packet data protocol context response message.

With reference to the third possible implementation manner of the sixth aspect, in a fourth possible implementation manner, the GTP message sending device includes a gateway GPRS support node (GGSN), and the GTP message response device includes a service GPRS support node (SGSN).

A seventh aspect of the disclosure provides a computer readable medium, which may include a computer executable instruction, so that when a processor of a computer executes the computer executable instruction, the computer executes the foregoing method for controlling sending of a GTP message according to the disclosure.

A eighth aspect of the embodiments of the disclosure provides a computer readable medium, which may include a computer executable instruction, so that when a processor of a computer executes the computer executable instruction, the computer executes the foregoing data sending method according to the disclosure.

As can be seen from the foregoing, in the embodiments of the disclosure, a GTP message sending device receives a no-response time indication of user equipment sent from a GTP message response device; and the GTP message sending device adjusts, according to no-response time of the user equipment indicated by the received no-response time indication of the user equipment, a strategy for sending, by the GTP message sending device, a GTP message, so that a time for the GTP message sending device to send the GTP message is postponed as the no-response time of the user equipment increases, or is brought forward as the no-response time of the user equipment decreases. In this way, it is ensured that before the no-response time of the user equipment is ended, a fault detection mechanism is not triggered, and a service of the user equipment is not interrupted or recovery of the GTP message sending device is not performed, thereby avoiding a service interruption of the user equipment or an unnecessary device recovery procedure on a network caused by an excessively long no-response time of a user.

BRIEF DESCRIPTION OF DRAWINGS

To describe the technical solutions in the embodiments of the disclosure more clearly, the following briefly introduces the accompanying drawings required for describing the embodiments. Apparently, the accompanying drawings in the following description show merely some embodiments of the disclosure, and a person of ordinary skill in the art may still derive other drawings from these accompanying drawings without creative efforts.

FIG. 1 is a schematic flowchart of an embodiment of a method for controlling sending of a GTP message according to the disclosure;

FIG. 2 is a schematic structural composition diagram of an embodiment of a GTP message sending device according to an embodiment of the disclosure;

DESCRIPTION OF EMBODIMENTS

Figure 3:
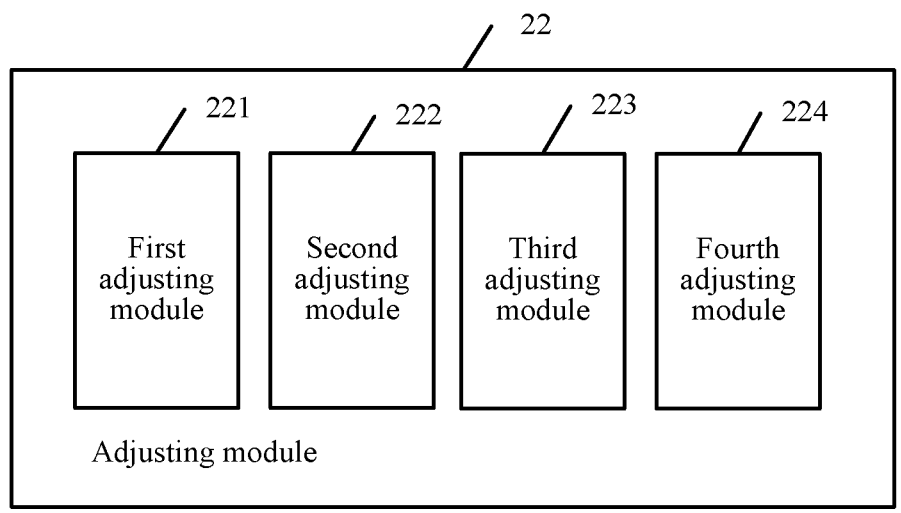
FIG. 3 is a schematic structural composition diagram of an embodiment of an adjusting module in FIG. 2.

The following clearly describes the technical solutions in the embodiments of the disclosure with reference to the accompanying drawings in the embodiments of the disclosure. Apparently, the described embodiments are merely some but not all of the embodiments of the disclosure. All other embodiments obtained by a person of ordinary skill in the art based on the embodiments of the disclosure without creative efforts shall fall within the protection scope of the present application.

FIG. 1 is a schematic flowchart of an embodiment of a method for controlling sending of a GTP message according to the disclosure. As shown in FIG. 1, the method for controlling sending of a GTP message may include the following steps.

Step S110: A GTP message sending device receives a no-response time indication of user equipment sent from a GTP message response device, where the no-response time indication indicates a no-response time of the user equipment in an implicit or explicit manner.

In specific implementation, the no-response time indication may indicate the no-response time of the user equipment in an implicit manner, for example, the no-response time of the user equipment is indicated by using a preset identifier, and when receiving the identifier from the GTP message response device, the GTP message sending device may know the no-response time, corresponding to the identifier, of the user equipment.

In specific implementation, the no-response time indication may indicate the no-response time of the user equipment in an explicit manner, the GTP message response device directly reports the no-response time of the user equipment to the GTP message sending device.

In specific implementation, the no-response time of the user equipment in this embodiment of the disclosure may include a no-response time span or an end time of a no-response state. For example, the no-response time may be a DRX period (for example, 30 minutes) set when the user equipment is in an idle state, or the no-response time may be a time at which an electricity saving state of the user equipment is ended (for example, 9:00).

In some feasible implementation manners, the GTP message sending device in this embodiment of the disclosure may include a packet data network gateway (P-GW), and in this case, the GTP message response device includes a serving gateway (S-GW); or the GTP message sending device may include a serving gateway (S-GW), and in this case, the GTP message response device includes a mobility management entity (MME). Then, in step S110, the GTP message sending device receives a create session request message sent from the GTP message response device, where the create session request message carries the no-response time indication of the user equipment; or the GTP message sending device receives a bearer response message sent from the GTP message response device, where the bearer response message carries the no-response time indication of the user equipment, and the bearer response message includes at least one of a create bearer response message, a bearer modification response message, a bearer deactivation response message, and a delete bearer response message; or the GTP message sending device receives a downlink data notification acknowledgment message sent from the GTP message response device, where the downlink data notification acknowledgment message carries the no-response time indication of the user equipment. When the GTP message sending device may include a packet data network gateway (P-GW), and the GTP message response device includes a serving gateway (S-GW), the P-GW may receive the no-response time indication of the user equipment from the S-GW when receiving a create session request message, a bearer response message, a create bearer response message, a bearer modification response message, a bearer deactivation response message, or a delete bearer response message from the S-GW. When the GTP message sending device may include a serving gateway (S-GW), and the GTP message response device includes a mobility management entity (MME), the S-GW may also receive the no-response time indication of the user equipment from the MME when receiving a create session request message, a bearer response message, a create bearer response message, a bearer modification response message, a bearer deactivation response message, or a delete bearer response message from the MME.

In some feasible implementation manners, the GTP message sending device in this embodiment of the disclosure may include a gateway GPRS support node (GGSN), and in this case, the GTP message response device includes a service GPRS support node (SGSN). Then, in step S110, the GTP message sending device receives a create packet data protocol context request message sent from the GTP message response device, where the create packet data protocol context request message carries the no-response time indication of the user equipment; or the GTP message sending device receives a packet data protocol context response message sent from the GTP message response device, where the packet data protocol context response message carries the no-response time indication of the user equipment, and the packet data protocol context response message includes at least one of an update packet data protocol context response message and a delete packet data protocol context response message. When the GTP message sending device includes a gateway GPRS support node (GGSN), and the GTP message response device includes a service GPRS support node (SGSN), the GGSN may receive the no-response time indication of the user equipment from the SGSN when receiving a create packet data protocol context request message, or an update packet data protocol context response message, or a delete packet data protocol context response message from the SGSN.

Step S111: The GTP message sending device adjusts, according to the no-response time of the user equipment indicated by the received no-response time indication of the user equipment, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases.

In specific implementation, in step S111, that the GTP message sending device adjusts, according to the no-response time of the user equipment indicated by the received no-response time indication of the user equipment, a time of sending a GTP message includes any one of the following manners.

Manner 1: The GTP message sending device adjusts duration of a retransmission timer (whose duration is T3-RESPONSE) to be greater than duration of the no-response time of the user equipment, where the duration of the retransmission timer is duration of retransmission of the GTP message performed by the GTP message sending device. For example, assuming that after sending a create bearer request message to the S-GW, the P-GW sets the retransmission timer to start timing, if the P-GW has not received a create bearer response message from the S-GW when the duration of the retransmission timer arrives, the P-GW retransmits the sent create bearer request message. In this embodiment of the disclosure, the duration of the retransmission timer of the GTP message sending device is set to be variable according to the no-response time of the user equipment, and is set to be longer than the no-response time of the user equipment (in this embodiment of the disclosure, the time for the GTP message sending device to send the GTP message is postponed as the no-response time of the user equipment increases, or is brought forward as the no-response time of the user equipment decreases, and especially, when the no-response time increases, the time of sending the GTP message is postponed as the no-response time of the user equipment increases); then, before the no-response time of the user equipment is ended, the GTP message sending device in this embodiment of the disclosure does not retransmit the GTP message, and a service of the user equipment is not interrupted or recovery of the GTP message sending device is not performed, thereby avoiding a service interruption of the user equipment or an unnecessary device recovery procedure on a network caused by an excessively long no-response time of a user.

Manner 2: The GTP message sending device adjusts a product of duration of a retransmission timer (whose duration is T3-RESPONSE) and a quantity-of-times threshold of a retransmission counter (where the quantity-of-times threshold is recorded as N3-REQUESTS, and generally, when a quantity of times of retransmissions is greater than a quantity of times defined by N3-REQUESTS (for example, five times), the GTP message sending device considers that a path fault occurs, records information about the fault, and deletes a corresponding user/bearer context or initiates a device recovery procedure) to be greater than duration of the no-response time of the user equipment (in this embodiment of the disclosure, the time for the GTP message sending device to send the GTP message is postponed as the no-response time of the user equipment increases, or is brought forward as the no-response time of the user equipment decreases, and especially, when the no-response time increases, the time of sending the GTP message is postponed as the no-response time of the user equipment increases). For example, assuming that after sending a create bearer request message to the S-GW, the P-GW sets the retransmission timer to start timing, if the P-GW has not received a create bearer response message from the S-GW when the duration of the retransmission timer arrives, the P-GW retransmits the sent create bearer request message. In this embodiment of the disclosure, the product of the duration of T3-RESPONSE of the GTP message sending device and the quantity of times defined by N3-REQUESTS of the retransmission counter is made to be greater than the duration of the no-response time of the user equipment; in this way, before the no-response time of the user equipment is ended, a service of the user equipment is not interrupted or recovery of the GTP message sending device is not performed, thereby avoiding a service interruption of the user equipment or an unnecessary device recovery procedure on a network caused by an excessively long no-response time of a user.

Manner 3: The GTP message sending device stops retransmission of the GTP message (in this embodiment of the disclosure, the time for the GTP message sending device to send the GTP message is postponed as the no-response time of the user equipment increases, or is brought forward as the no-response time of the user equipment decreases, and especially, when the no-response time increases, the time of sending the GTP message is postponed as the no-response time of the user equipment increases); in this manner, retransmission of the GTP message is directly stopped to ensure that before the no-response time of the user equipment is ended, the GTP message sending device in this embodiment of the disclosure does not retransmit the GTP message, thereby avoiding a service interruption of the user equipment or an unnecessary device recovery procedure on a network caused by an excessively long no-response time of a user.

Manner 4: The GTP message sending device stops sending the GTP message before the no-response time of the user equipment is ended (in this embodiment of the disclosure, the time for the GTP message sending device to send the GTP message is postponed as the no-response time of the user equipment increases, or is brought forward as the no-response time of the user equipment decreases, and especially, when the no-response time increases, the time of sending the GTP message is postponed as the no-response time of the user equipment increases). In this manner, a method of directly stopping the GTP message before the no-response time is ended is used to ensure that before the no-response time of the user equipment is ended, the GTP message sending device in this embodiment of the disclosure does not retransmit the GTP message, and a service of the user equipment is not interrupted or recovery of the GTP message sending device is not performed, thereby avoiding a service interruption of the user equipment or an unnecessary device recovery procedure on a network caused by an excessively long no-response time of a user.

As can be seen from the foregoing, in this embodiment of the disclosure, a GTP message sending device receives a no-response time indication of user equipment sent from a GTP message response device, where the no-response time indication indicates a no-response time of the user equipment in an implicit or explicit manner; and the GTP message sending device adjusts, according to the no-response time of the user equipment indicated by the received no-response time indication of the user equipment, a strategy for sending, by the GTP message sending device, a GTP message, so that a time for the GTP message sending device to send the GTP message is postponed as the no-response time of the user equipment increases, or is brought forward as the no-response time of the user equipment decreases. In this way, it is ensured that before the no-response time of the user equipment is ended, a fault detection mechanism is not triggered, and a service of the user equipment is not interrupted or recovery of the GTP message sending device is not performed, thereby avoiding a service interruption of the user equipment or an unnecessary device recovery procedure on a network caused by an excessively long no-response time of a user.

FIG. 2 is a schematic structural composition diagram of an embodiment of a GTP message sending device according to an embodiment of the disclosure. The GTP message sending device may be configured to implement the process shown in FIG. 1, and as shown in FIG. 2, the GTP message sending device may include: a receiving module 21 and an adjusting module 22.

The receiving module 21 is configured to receive a no-response time indication of user equipment sent from a GTP message response device, where the no-response time indication indicates a no-response time of the user equipment in an implicit or explicit manner.

In specific implementation, the no-response time indication may indicate the no-response time of the user equipment in an implicit manner, for example, the no-response time of the user equipment is indicated by using a preset identifier, and when receiving the identifier from the GTP message response device, the GIP message sending device may know the no-response time, corresponding to the identifier, of the user equipment.

In specific implementation, the no-response time indication may indicate the no-response time of the user equipment in an explicit manner, the GTP message response device directly reports the no-response time of the user equipment to the GTP message sending device.

In specific implementation, the no-response time of the user equipment in this embodiment of the disclosure may include a no-response time span or an end time of a no-response state. For example, the no-response time may be a DRX period (for example, 30 minutes) set when the user equipment is in an idle state, or the no-response time may be time at which an electricity saving state of the user equipment is ended (for example, 9:00).

In some feasible implementation manners, the GTP message sending device in this embodiment of the disclosure may include a packet data network gateway (P-GW), and in this case, the GTP message response device includes a serving gateway (S-GW); or the GTP message sending device may include a serving gateway (S-GW), and in this case, the GTP message response device includes a mobility management entity (MME). Then, the receiving module 21 is specifically configured to receive a create session request message sent from the GTP message response device, where the create session request message carries the no-response time indication of the user equipment; or receive a bearer response message sent from the GTP message response device, where the bearer response message carries the no-response time indication of the user equipment, and the bearer response message includes at least one of a create bearer response message, a bearer modification response message, a bearer deactivation response message, and a delete bearer response message; or receive a downlink data notification acknowledgment message sent from the GTP message response device, where the downlink data notification acknowledgment message carries the no-response time indication of the user equipment. When the GTP message sending device includes a packet data network gateway (P-GW), and the GTP message response device includes a serving gateway (S-GW), the P-GW may receive the no-response time indication of the user equipment from the S-GW when receiving a create session request message, a bearer response message, a create bearer response message, a bearer modification response message, a bearer deactivation response message, or a delete bearer response message from the S-GW. When the GTP message sending device may include a serving gateway (S-GW), and the GTP message response device includes a mobility management entity (MME), the S-GW may also receive the no-response time indication of the user equipment from the MME when receiving a create session request message, a bearer response message, a create bearer response message, a bearer modification response message, a bearer deactivation response message, or a delete bearer response message from the MME.

In some feasible implementation manners, the GTP message sending device in this embodiment of the disclosure may include a gateway GPRS support node (GGSN), and in this case, the GTP message response device includes a service GPRS support node (SGSN). Then, the receiving module 21 is specifically configured to receive a create packet data protocol context request message sent from the GTP message response device, where the create packet data protocol context request message carries the no-response time indication of the user equipment; or receive a packet data protocol context response message sent from the GTP message response device, where the packet data protocol context response message carries the no-response time indication of the user equipment, and the packet data protocol context response message includes at least one of an update packet data protocol context response message and a delete packet data protocol context response message. When the GTP message sending device includes a gateway GPRS support node (GGSN), and the GTP message response device includes a service GPRS support node (SGSN), the GGSN may receive the no-response time indication of the user equipment from the SGSN when receiving a create packet data protocol context request message, or an update packet data protocol context response message, or a delete packet data protocol context response message from the SGSN.

The adjusting module 22 is configured to adjust, according to the no-response time of the user equipment indicated by the no-response time indication of the user equipment received by the receiving module 21, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases.

Further, as shown in FIG. 3, the adjusting module 22 in this embodiment of the disclosure may include at least one of a first adjusting module 221, a second adjusting module 222, a third adjusting module 223, and a fourth adjusting module 224.

The first adjusting module 221 is configured to adjust duration of a retransmission timer (whose duration is T3-RESPONSE) to be greater than duration of the no-response time of the user equipment, where the duration of the retransmission timer is duration of retransmission of the GTP message performed by the GTP message sending device. For example, assuming that after sending a create bearer request message to the S-GW, the P-GW sets the retransmission timer to start timing, if the P-GW has not received a create bearer response message from the S-GW when the duration of the retransmission timer arrives, the P-GW retransmits the sent create bearer request message. In this embodiment of the disclosure, the duration of the retransmission timer of the GTP message sending device is set to be variable according to the no-response time of the user equipment, and is set to be longer than the no-response time of the user equipment (in this embodiment of the disclosure, the a time for the GTP message sending device to send the GTP message is postponed as the no-response time of the user equipment increases, or is brought forward as the no-response time of the user equipment decreases, and especially, when the no-response time increases, the time of sending the GTP message is postponed as the no-response time of the user equipment increases); then, before the no-response time of the user equipment is ended, the GTP message sending device in this embodiment of the disclosure does not retransmit the GTP message, and a service of the user equipment is not interrupted or recovery of the GTP message sending device is not performed, thereby avoiding a service interruption of the user equipment or an unnecessary device recovery procedure on a network caused by an excessively long no-response time of a user.

The second adjusting module 222 is configured to adjust a product of duration of a retransmission timer (whose duration is T3-RESPONSE) and a quantity-of-times threshold of a retransmission counter (where the quantity-of-times threshold is recorded as N3-REQUESTS, and generally, when a quantity of times of retransmissions is greater than a quantity of times defined by N3-REQUESTS (for example, five times), the GTP message sending device considers that a path fault occurs, records information about the fault, and deletes a corresponding user/bearer context or initiates a device recovery procedure) to be greater than duration of the no-response time of the user equipment (in this embodiment of the disclosure, the time for the GTP message sending device to send the GTP message is postponed as the no-response time of the user equipment increases, or is brought forward as the no-response time of the user equipment decreases, and especially, when the no-response time increases, the time of sending the GTP message is postponed as the no-response time of the user equipment increases). For example, assuming that after sending a create bearer request message to the S-GW, the P-GW sets the retransmission timer to start timing, if the P-GW has not received a create bearer response message from the S-GW when the duration of the retransmission timer arrives, the P-GW retransmits the sent create bearer request message. In this embodiment of the disclosure, the product of the duration of T3-RESPONSE of the GTP message sending device and the quantity of times defined by N3-REQUESTS of the retransmission counter is made to be greater than the duration of the no-response time of the user equipment; in this way, before the no-response time of the user equipment is ended, a service of the user equipment is not interrupted or recovery of the GTP message sending device is not performed, thereby avoiding a service interruption of the user equipment or an unnecessary device recovery procedure on a network caused by an excessively long no-response time of a user.

The third adjusting module 223 is configured to stop retransmission of the GTP message (in this embodiment of the disclosure, the time for the GTP message sending device to send the GTP message is postponed as the no-response time of the user equipment increases, or is brought forward as the no-response time of the user equipment decreases, and especially, when the no-response time increases, the time of sending the GTP message is postponed as the no-response time of the user equipment increases); in this manner, retransmission of the GTP message is directly stopped to ensure that before the no-response time of the user equipment is ended, the GTP message sending device in this embodiment of the disclosure does not retransmit the GTP message, and a service of the user equipment is not interrupted or recovery of the GTP message sending device is not performed, thereby avoiding a service interruption of the user equipment or an unnecessary device recovery procedure on a network caused by an excessively long no-response time of a user.

The fourth adjusting module 224 is configured to stop sending the GTP message before the no-response time of the user equipment is ended (in this embodiment of the disclosure, the time for the GTP message sending device to send the GTP message is postponed as the no-response time of the user equipment increases, or is brought forward as the no-response time of the user equipment decreases, and especially, when the no-response time increases, the time of sending the GTP message is postponed as the no-response time of the user equipment increases). In this manner, a method of directly stopping the GTP message before the no-response time is ended is used to ensure that before the no-response time of the user equipment is ended, the GTP message sending device in this embodiment of the disclosure does not retransmit the GTP message, and a service of the user equipment is not interrupted or recovery of the GTP message sending device is not performed, thereby avoiding a service interruption of the user equipment or an unnecessary device recovery procedure on a network caused by an excessively long no-response time of a user.

As can be seen from the foregoing, in this embodiment of the disclosure, a GTP message sending device receives a no-response time indication of user equipment sent from a GTP message response device, where the no-response time indication indicates a no-response time of the user equipment in an implicit or explicit manner; and the GTP message sending device adjusts, according to the no-response time of the user equipment indicated by the received no-response time indication of the user equipment, a strategy for sending, by the GTP message sending device, a GTP message, so that a time for the GTP message sending device to send the GTP message is postponed as the no-response time of the user equipment increases, or is brought forward as the no-response time of the user equipment decreases. In this way, it is ensured that before the no-response time of the user equipment is ended, a fault detection mechanism is not triggered, and a service of the user equipment is not interrupted or recovery of the GTP message sending device is not performed, thereby avoiding a service interruption of the user equipment or an unnecessary device recovery procedure on a network caused by an excessively long no-response time of a user.

Figure 4:
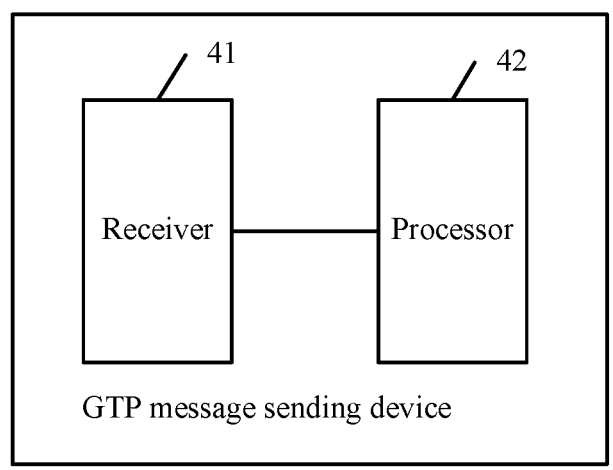
FIG. 4 is a schematic structural composition diagram of another embodiment of a GIP message sending device according to the disclosure.

FIG. 4 is a schematic structural composition diagram of another embodiment of a CTP message sending device according to the disclosure. As can be known with reference to FIG. 4, FIG. 4 differs from the embodiment shown in FIG. 2 to FIG. 3 in that, an exemplary description of the CTP message sending device is provided from the perspective of composition of a hardware structure. Specifically, as shown in FIG. 4, the CTP message sending device in this embodiment of the disclosure may include: a receiver 41 and a processor 42.

The receiver 41 is configured to receive a no-response time indication of user equipment sent from a GTP message response device, where the no-response time indication indicates a no-response time of the user equipment in an implicit or explicit manner. In specific implementation, functions that need to be implemented by the receiver 41 in this embodiment are similar to functions of the receiving module 21 in the embodiment shown in FIG. 2, and therefore, details of function implementation of the receiver 41 are not described herein again.

The processor 42 is configured to adjust, according to the no-response time of the user equipment indicated by the no-response time indication of the user equipment received by the receiver 41, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases. In specific implementation, functions that need to be implemented by the processor 42 in this embodiment are similar to functions implemented by the adjusting module 22 in FIG. 2 to FIG. 3, and therefore, details of function implementation of the processor 42 are not described herein again.

In specific implementation, the GTP message sending device in this embodiment includes a packet data network gateway (P-GW), and the GTP message response device includes a serving gateway (S-GW); or the GTP message sending device includes a serving gateway (S-GW), and the GTP message response device includes a mobility management entity (MME). Alternatively, the GTP message sending device includes a gateway GPRS support node (GGSN), and the GTP message response device includes a service GPRS support node (SGSN).

In specific implementation, the no-response time of the user equipment in this embodiment of the disclosure may include a no-response time span or an end time of a no-response state. For example, the no-response time may be a DRX period (for example, 30 minutes) set when the user equipment is in an idle state, or the no-response time may be a time at which an electricity saving state of the user equipment is ended (for example, 9:00).

Figure 5:
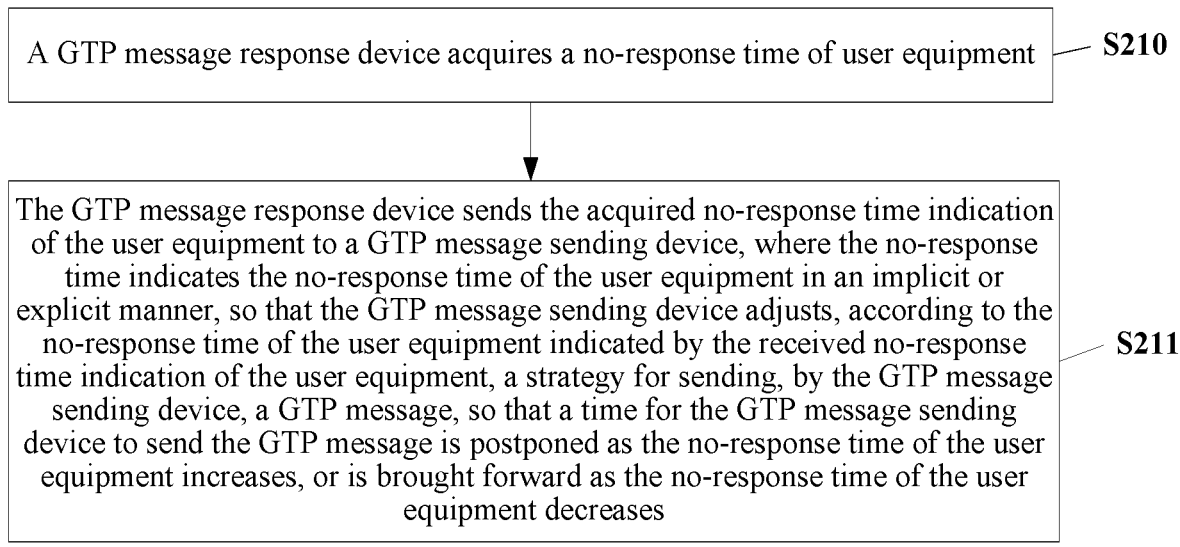
FIG. 5 is a schematic flowchart of an embodiment of a data sending method according to the disclosure.

FIG. 5 is a schematic flowchart of an embodiment of a data sending method according to the disclosure. As shown in FIG. 5, the data sending method may include the following steps:

Step S210: A GTP message response device acquires a no-response time indication of user equipment.

In specific implementation, a no-response time of the user equipment in this embodiment of the disclosure may include a no-response time span or an end time of a no-response state. For example, the no-response time may be a DRX period (for example, 30 minutes) set when the user equipment is in an idle state, or the no-response time may be a time at which an electricity saving state of the user equipment is ended (for example, 9:00).

In specific implementation, the GTP message response device may acquire the no-response time of the user equipment in at least one of the following manners: acquiring the no-response time of the user equipment by means of configuration, acquiring the no-response time of the user equipment by receiving signaling from the user equipment, and acquiring the no-response time of the user equipment from subscription information of the user equipment.

Step S211: The GTP message response device sends the acquired no-response time indication of the user equipment to a GTP message sending device, where the no-response time indication indicates a no-response time of the user equipment in an implicit or explicit manner, so that the GTP message sending device adjusts, according to the no-response time of the user equipment indicated by the received no-response time indication of the user equipment, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases.

In some feasible implementation manners, the GTP message sending device in this embodiment of the disclosure may include a packet data network gateway (P-GW), and in this case, the GTP message response device includes a serving gateway (S-GW); or the GTP message sending device may include a serving gateway (S-GW), and in this case, the GTP message response device includes a mobility management entity (MME). Then, in step S211, the GTP message response device sends a create session request message to the GTP message sending device, where the create session request message carries the no-response time indication of the user equipment; or the GTP message response device sends a bearer response message to the GTP message sending device, where the bearer response message carries the no-response time indication of the user equipment, and the bearer response message includes at least one of a create bearer response message, a bearer modification response message, a bearer deactivation response message, and a delete bearer response message; or the GTP message response device sends a downlink data notification acknowledgment message to the GTP message sending device, where the downlink data notification acknowledgment message carries the no-response time indication of the user equipment. When the GTP message sending device may include a packet data network gateway (P-GW), and the GTP message response device includes a serving gateway (S-GW), the S-GW may send the no-response time indication of the user equipment to the P-GW when sending a create session request message, a bearer response message, a create bearer response message, a bearer modification response message, a bearer deactivation response message, or a delete bearer response message to the P-GW. When the GTP message sending device includes a serving gateway (S-GW), and the GTP message response device includes a mobility management entity (MME), the MME may also send the no-response time indication of the user equipment to the S-GW when sending a create session request message, a bearer response message, a create bearer response message, a bearer modification response message, a bearer deactivation response message, or a delete bearer response message to the S-GW.

In some feasible implementation manners, the GTP message sending device in this embodiment of the disclosure may include a gateway GPRS support node (GGSN), and in this case, the GTP message response device includes a service GPRS support node (SGSN). Then, in step S211, the GTP message response device sends a create packet data protocol context request message to the GTP message sending device, where the create packet data protocol context request message carries the no-response time indication of the user equipment; or the GTP message response device sends a packet data protocol context response message to the GTP message sending device, where the packet data protocol context response message carries the no-response time indication of the user equipment, and the packet data protocol context response message includes at least one of an update packet data protocol context response message and a delete packet data protocol context response message. When the GTP message sending device includes a gateway GPRS support node (GGSN), and the GTP message response device includes a service GPRS support node (SGSN), the SGSN may send the no-response time indication of the user equipment to the GGSN when sending a create packet data protocol context request message, or an update packet data protocol context response message, or a delete packet data protocol context response message to the GGSN.

As can be seen from the foregoing, in this embodiment of the disclosure, a GTP message response device sends a no-response time indication of user equipment to a GTP message sending device, so that the GTP message sending device adjusts, according to a no-response time of the user equipment indicated by the no-response time indication of the user equipment, a strategy for sending, by the GTP message sending device, a GTP message, so that a time for the GTP message sending device to send the GTP message is postponed as the no-response time of the user equipment increases, or is brought forward as the no-response time of the user equipment decreases. In this way, it is ensured that before the no-response time of the user equipment is ended, a fault detection mechanism is not triggered, and a service of the user equipment is not interrupted or recovery of the GTP message sending device is not performed, thereby avoiding a service interruption of the user equipment or an unnecessary device recovery procedure on a network caused by an excessively long no-response time of a user.

Figure 6:
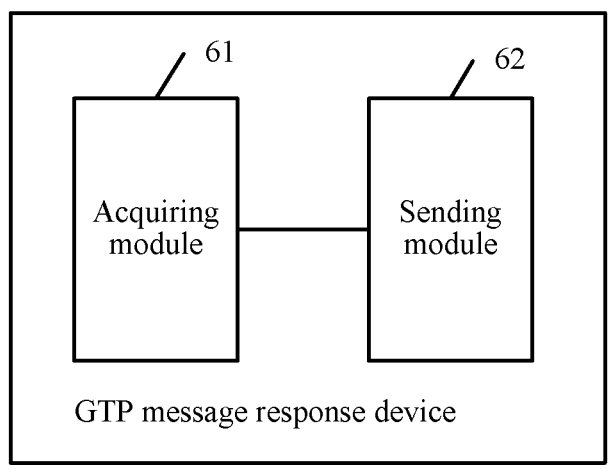
FIG. 6 is a schematic structural composition diagram of an embodiment of a GTP message response device according to the disclosure.

FIG. 6 is a schematic structural composition diagram of an embodiment of a GTP message response device according to the disclosure. The GTP message response device may be configured to implement the method shown in FIG. 5. As shown in FIG. 6, the GTP message response device may include: an acquiring module 61 and a sending module 62.

The acquiring module 61 is configured to acquire a no-response time indication of user equipment.

In specific implementation, a no-response time of the user equipment in this embodiment of the disclosure may include a no-response time span or an end time of a no-response state. For example, the no-response time may be a DRX period (for example, 30 minutes) set when the user equipment is in an idle state, or the no-response time may be a time at which an electricity saving state of the user equipment is ended (for example, 9:00).

In specific implementation, the acquiring module 61 may acquire the no-response time of the user equipment in at least one of the following manners: acquiring the no-response time of the user equipment by means of configuration, acquiring the no-response time of the user equipment by receiving signaling from the user equipment, and acquiring the no-response time of the user equipment from subscription information of the user equipment.

The sending module 62 is configured to send the acquired no-response time indication of the user equipment to a GTP message sending device, where the no-response time indication indicates a no-response time of the user equipment in an implicit or explicit manner, so that the GTP message sending device adjusts, according to the no-response time of the user equipment indicated by the received no-response time indication of the user equipment, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases.

In some feasible implementation manners, the GTP message sending device in this embodiment of the disclosure may include a packet data network gateway (P-GW), and in this case, the GTP message response device includes a serving gateway (S-GW); or the GTP message sending device may include a serving gateway (S-GW), and in this case, the GTP message response device includes a mobility management entity (MME). Then, the sending module 62 is specifically configured to send a create session request message, where the create session request message carries the no-response time indication of the user equipment; or send a bearer response message to the GTP message sending device, where the bearer response message carries the no-response time indication of the user equipment, and the bearer response message includes at least one of a create bearer response message, a bearer modification response message, a bearer deactivation response message, and a delete bearer response message; or the GTP message response device sends a downlink data notification acknowledgment message to the GTP message sending device, where the downlink data notification acknowledgment message carries the no-response time indication of the user equipment.

When the GTP message sending device may include a packet data network gateway (P-GW), and the GTP message response device includes a serving gateway (S-GW), the S-GW may send the no-response time indication of the user equipment to the P-GW when sending a create session request message, a bearer response message, a create bearer response message, a bearer modification response message, a bearer deactivation response message, or a delete bearer response message to the P-GW. When the GTP message sending device includes a serving gateway (S-GW), and the GTP message response device includes a mobility management entity (MME), the MME may also send the no-response time indication of the user equipment to the S-GW when sending a create session request message, a bearer response message, a create bearer response message, a bearer modification response message, a bearer deactivation response message, or a delete bearer response message to the S-GW.

In some feasible implementation manners, the GTP message sending device in this embodiment of the disclosure may include a gateway GPRS support node (GGSN), and in this case, the GTP message response device includes a service GPRS support node (SGSN). The sending module 62 is specifically configured to send a create packet data protocol context request message to the GTP message sending device, where the create packet data protocol context request message carries the no-response time indication of the user equipment; or send a packet data protocol context response message to the GTP message sending device, where the packet data protocol context response message carries the no-response time indication of the user equipment, and the packet data protocol context response message includes at least one of an update packet data protocol context response message and a delete packet data protocol context response message. That is, when the GTP message sending device includes a gateway GPRS support node (GGSN), and the GTP message response device includes a service GPRS support node (SGSN), the SGSN may send the no-response time indication of the user equipment to the GGSN when sending a create packet data protocol context request message, or an update packet data protocol context response message, or a delete packet data protocol context response message to the GGSN.

As can be seen from the foregoing, in this embodiment of the disclosure, a GTP message response device sends a no-response time indication of user equipment to a GTP message sending device, so that the GTP message sending device adjusts, according to a no-response time of the user equipment indicated by the no-response time indication of the user equipment, a strategy for sending, by the GTP message sending device, a GTP message, so that a time for the GTP message sending device to send the GTP message is postponed as the no-response time of the user equipment increases, or is brought forward as the no-response time of the user equipment decreases. In this way, it is ensured that before the no-response time of the user equipment is ended, a fault detection mechanism is not triggered, and a service of the user equipment is not interrupted or recovery of the GTP message sending device is not performed, thereby avoiding a service interruption of the user equipment or an unnecessary device recovery procedure on a network caused by an excessively long no-response time of a user.

Figure 7:
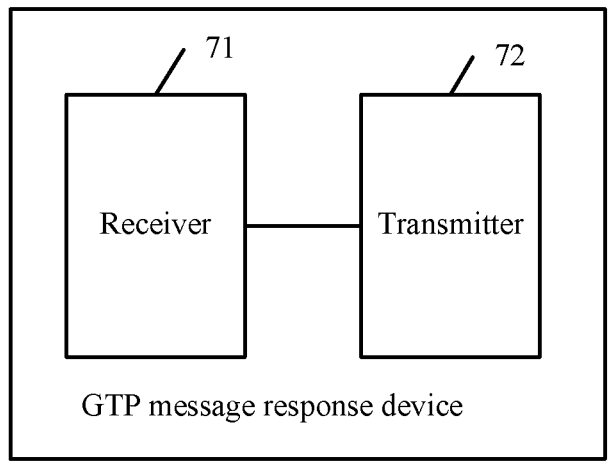
FIG. 7 is a schematic structural composition diagram of another embodiment of a GTP message response device according to the disclosure.

FIG. 7 is a schematic structural composition diagram of another embodiment of a GTP message response device according to the disclosure. As can be known with reference to FIG. 7, FIG. 7 differs from the embodiment shown in FIG. 6 in that, an exemplary description of the CTP message sending device is provided from the perspective of composition of a hardware structure. Specifically, as shown in FIG. 7, the CTP message response device in this embodiment of the disclosure may include: a receiver 71 and a transmitter 72.

The receiver 71 is configured to acquire a no-response time indication of user equipment. In specific implementation, functions that need to be implemented by the receiver 71 in this embodiment are similar to functions of the acquiring module 61 in the embodiment shown in FIG. 6, and therefore, details of function implementation of the receiver 71 are not described herein again.

The transmitter 72 is configured to send the no-response time indication of the user equipment acquired by the receiver to a GTP message sending device, where the no-response time indication indicates a no-response time of the user equipment in an implicit or explicit manner, so that the GTP message sending device adjusts, according to the no-response time of the user equipment indicated by the received no-response time indication of the user equipment, a time of sending a GTP message, where adjusting the time of sending the GTP message is specifically postponing the time of sending the GTP message as the no-response time of the user equipment increases, or bringing forward the time of sending the GTP message as the no-response time of the user equipment decreases. In specific implementation, functions that need to be implemented by the transmitter 72 in this embodiment are similar to functions implemented by the sending module 62 in FIG. 6, and therefore, details of function implementation of the transmitter 72 are not described herein again.

In specific implementation, the GTP message sending device in this embodiment includes a packet data network gateway (P-GW), and the GTP message response device includes a serving gateway (S-GW); or the GTP message sending device includes a serving gateway (S-GW), and the GTP message response device includes a mobility management entity (MME). Alternatively, the GTP message sending device includes a gateway GPRS support node (GGSN), and the GTP message response device includes a service GPRS support node (SGSN).

In specific implementation, the no-response time of the user equipment in this embodiment of the disclosure may include a no-response time span or an end time of a no-response state. For example, the no-response time may be a DRX period (for example, 30 minutes) set when the user equipment is in an idle state, or the no-response time may be a time at which an electricity saving state of the user equipment is ended (for example, 9:00).

A person of ordinary skill in the art may understand that: all or some of the steps for implementing the foregoing method embodiments in the embodiments of the disclosure may be implemented by a program instructing relevant hardware. The foregoing program may be stored in a computer readable storage medium. When the program runs, steps of the foregoing method embodiments are executed; the foregoing storage medium includes: various media that can store program code, such as a ROM, a RAM, a magnetic disk, or an optical disc.

FIG. 8 to FIG. 13 further describe processes of the methods according to the embodiments of the disclosure in detail by using multiple specific application scenarios.

Figure 8:
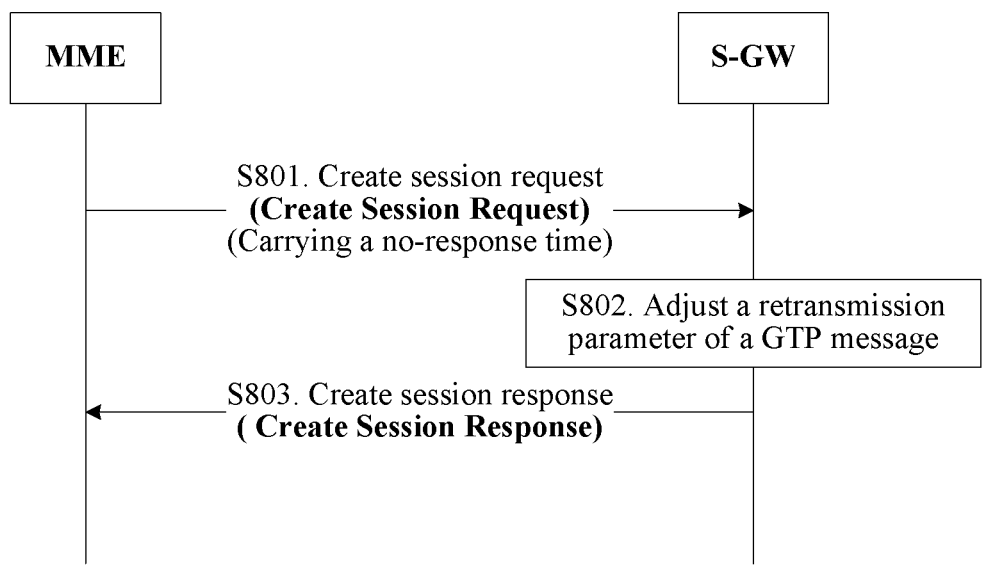
FIG. 8 shows a schematic flowchart of sending, by an MME, a no-response time of user equipment by using an attach procedure.

FIG. 8 shows a schematic flowchart of sending, by an MME, a no-response time of user equipment by using an attach procedure. As shown in FIG. 8, the process may include the following steps.

Step 801: An MME sends a create session request message to an S-GW, where the create session request message carries a no-response time of user equipment (in this case, the no-response time of the user equipment is indicated in an explicit manner, and in specific implementation, the no-response time of the user equipment may also be indicated in an implicit manner), indicating that maximum no-response duration of the user equipment is 30 minutes.

Step S802: The S-GW adjusts a retransmission parameter T3-RESPONSE and/or N3-REQUESTS of a GTP message according to the no-response time of the user equipment, for example, adjusts T3-RESPONSE to be greater than 30 minutes or adjusts a product of T3-RESPONSE and N3-REQUESTS to be greater than 30 minutes.

Step S803: The S-GW sends a create session response message to the MME.

Figure 9:
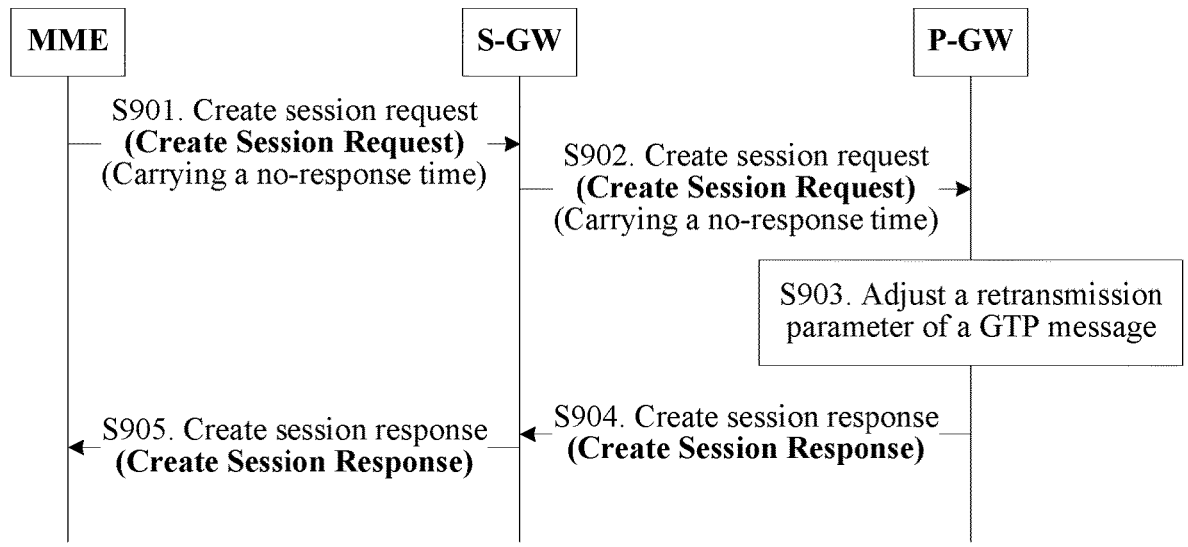
FIG. 9 shows another schematic flowchart of sending, by an MME, a no-response time of user equipment by using an attach procedure.

FIG. 9 shows a schematic flowchart of sending, by an MME, a no-response time of user equipment by using an attach procedure. As shown in FIG. 9, the process may include the following steps:

Step S901: An MME sends a create session request message to an S-GW, where the request carries a no-response time of user equipment, indicating that maximum no-response duration of the user equipment is 30 minutes.

Step S902: The S-GW sends a create session request message to a P-GW, where the request carries the no-response time of the user equipment, indicating that the maximum no-response duration of the user equipment is 30 minutes.

Step S903: The P-GW adjusts a retransmission parameter T3-RESPONSE and/or N3-REQUESTS of a GTP message according to the no-response time of the user equipment, for example, adjusts T3-RESPONSE to be greater than 30 minutes or adjusts a product of T3-RESPONSE and N3-REQUESTS to be greater than 30 minutes.

Step S904: The P-GW sends a create session response message to the S-GW.

Step S905: The S-GW sends a create session response message to the MME.

This embodiment differs from FIG. 8 in that, this embodiment includes a procedure in which the S-GW sends the no-response time of the user equipment to the P-GW.

Figure 10:
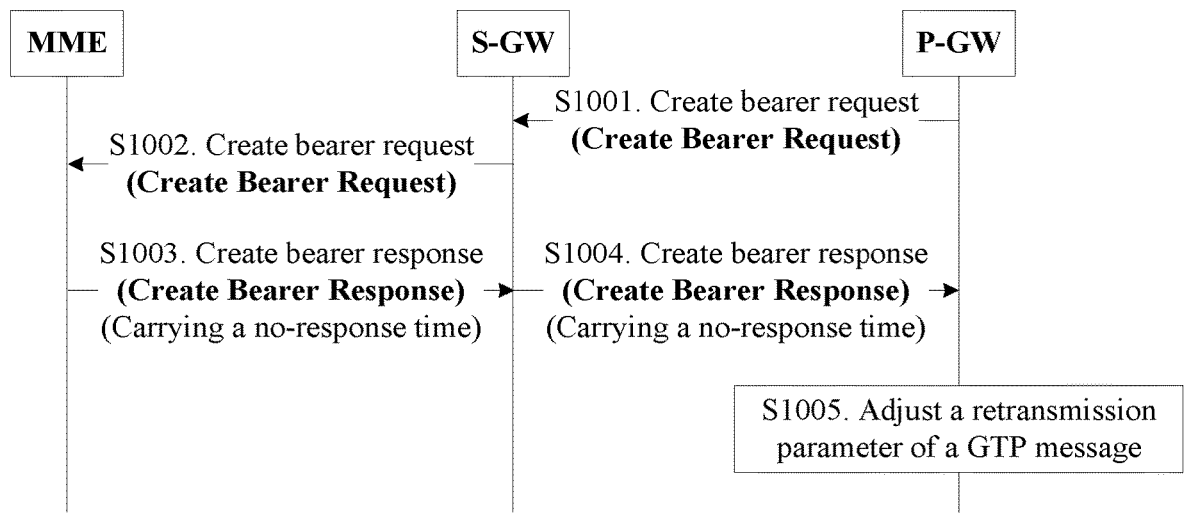
FIG. 10 shows a schematic flowchart of sending, by an MME, a no-response time of user equipment by using a bearer activation procedure.

FIG. 10 shows a schematic flowchart of sending, by an MME, a no-response time of user equipment by using a bearer activation procedure. As shown in FIG. 10, the process may include the following steps.

Step S1001: A P-GW sends a create bearer request message to an S-GW.

Step S1002: The S-GW sends a create bearer request message to an MME.

Step S1003: The MME rejects the create bearer request message, and adds a no-response time of user equipment to a create bearer response message and sends the create bearer response message to the S-GW.

Step S1004: The S-GW sends a create bearer response message to the P-GW, where the message carries the no-response time of the user equipment, for example, it indicates that maximum no-response duration of the user equipment is 30 minutes, or it indicates that a time at which the user equipment exits a no-response state is 9:00.

Step S1005: The P-GW adjusts a retransmission parameter T3-RESPONSE and/or N3-REQUESTS of a GTP message according to the no-response time of the user equipment, for example, adjusts T3-RESPONSE to be greater than 30 minutes or adjusts a product of T3-RESPONSE and N3-REQUESTS to be greater than 30 minutes; or postpones a time of sending the GTP message to the user equipment to be later than 9:00.

Figure 11:
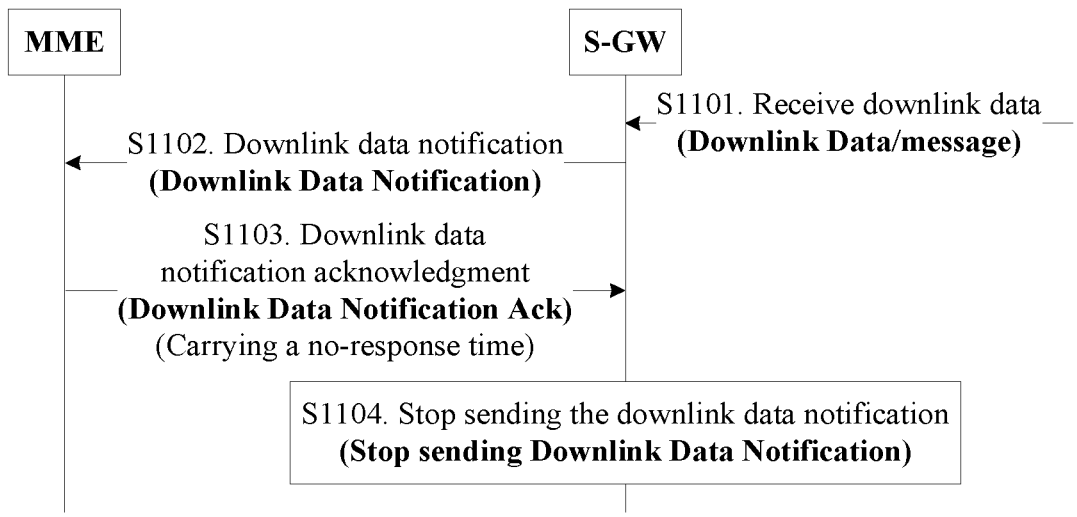
FIG. 11 shows a schematic flowchart of sending, by an MME, a no-response time of user equipment by using a network triggered service request procedure.

FIG. 11 shows a schematic flowchart of sending, by an MME, a no-response time of user equipment by using a network triggered service request procedure. As shown in FIG. 11, the process may include the following steps.

Step S1101: An S-GW receives downlink data, or receives bearer control signaling when user equipment activates an ISR.

Step S1102: The S-GW sends a downlink data notification message to an MME.

Step S1103: The MME sends a downlink data notification acknowledgment message to the S-GW, where the message indicates a no-response time of the user equipment, for example, indicates that maximum no-response duration of the user equipment is 30 minutes.

Step S1104: The S-GW stops sending the downlink data notification message of the user equipment before the no-response time of the user equipment expires.

Figure 12:
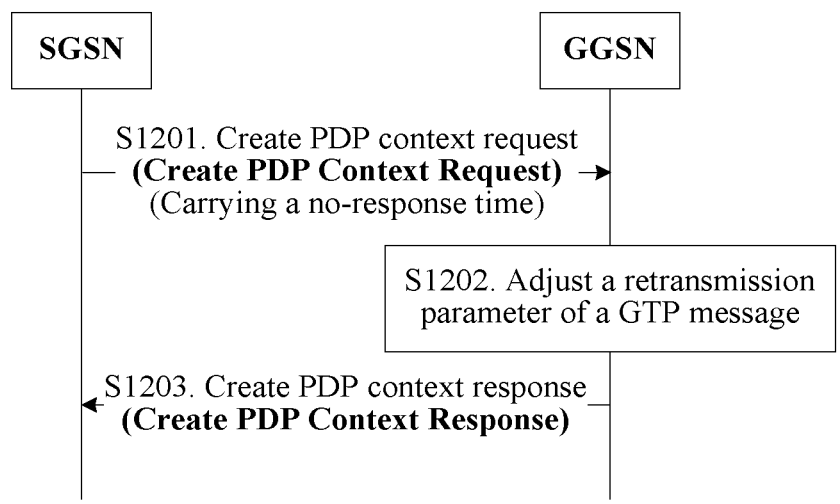
FIG. 12 shows a schematic flowchart of sending, by an SGSN, a no-response time of user equipment by using a packet data protocol PDP request procedure.

FIG. 12 shows a schematic flowchart of sending, by an SGSN, a no-response time of user equipment by using a packet data protocol (PDP) request procedure. As shown in FIG. 12, the process may include the following steps.

Step S1201: An SGSN sends a create PDP context request message to a GGSN, where the request carries a no-response time of user equipment, indicating maximum no-response duration of the user equipment, for example, 30 minutes.

Step S1202: The GGSN adjusts a retransmission parameter T3-RESPONSE and/or N3-REQUESTS of a GTP message according to the no-response time of the user equipment, for example, adjusts T3-RESPONSE to be greater than 30 minutes or adjusts a product of T3-RESPONSE and N3-REQUESTS to be greater than 30 minutes.

Step S1203: The GGSN sends a create PDP context response message to the SGSN.

Figure 13:
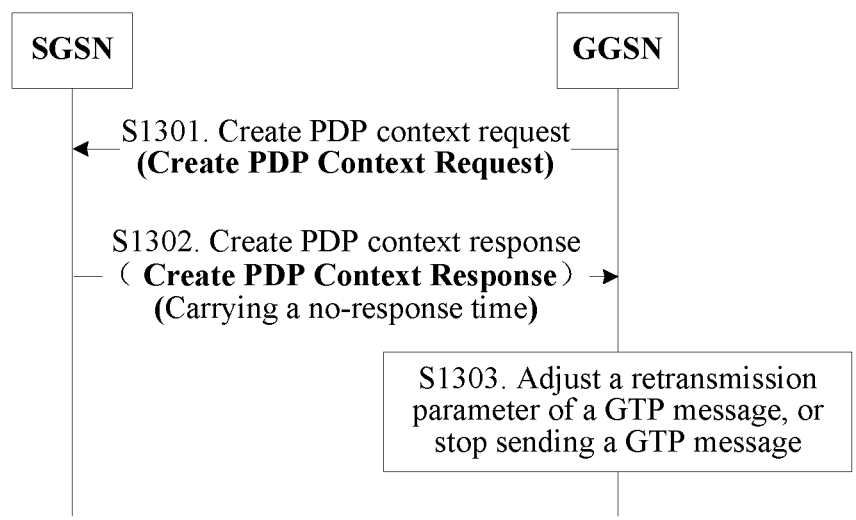
FIG. 13 shows another schematic flowchart of sending, by an SGSN, a no-response time of user equipment by using a packet data protocol PDP request procedure.

FIG. 13 shows a schematic flowchart of sending, by an SGSN, a no-response time of user equipment by using a packet data protocol (PDP) request procedure. As shown in FIG. 13, the process may include the following steps.

Step S1301: A GGSN sends a create PDP context request message to an SGSN.

Step S1302: The SGSN sends a create PDP context response message to the GGSN, where the response message carries a no-response time of user equipment, indicating maximum no-response duration of the user equipment, for example, 30 minutes, or indicating that a time at which the user equipment exits a no-response state is 9:00.

Step S1303: The GGSN adjusts a retransmission parameter T3-RESPONSE and/or N3-REQUESTS of a GTP message according to the no-response time of the user equipment, for example, adjusts T3-RESPONSE to be greater than 30 minutes or adjusts a product of T3-RESPONSE and N3-REQUESTS to be greater than 30 minutes; or postpones a time of sending the GTP message to the user equipment to be later than 9:00.

In this specification, specific examples are used to describe the principle and implementation manners of the disclosure, and the description of the embodiments is only intended to help understand the method and core idea of the disclosure. In addition, a person of ordinary skill in the art may, based on the idea of the present disclosure, make modifications with respect to the specific implementation manners and the application scope. Therefore, the content of this specification shall not be construed as a limitation to the present application.

What is claimed is:

1. A method for controlling sending of a general data transfer platform (GTP) message, the method comprising:
   receiving, by a GTP message sending device, a downlink data notification acknowledgment message carrying a time indication of user equipment from a GTP message response device, wherein the time indication provides information about a change in a time period of an idle state or an ending time of an energy saving state of the user equipment;
   monitoring, by the GTP message sending device, the time indication to determine a time of sending the GTP message to the user equipment; and
   adjusting, by the GTP message sending device, the time of sending the GTP message in response to changes in the time period, so as to avoid sending the GTP message before expiration of the time period when the user equipment is in the idle state or the ending time of the energy saving state.

2. The method according to claim 1, wherein adjusting the time of sending the GTP message comprises:
   before ending the time of sending the GTP message, stopping, by the GTP message sending device, the sending of the GTP message.

3. The method according to claim 1, wherein the time of sending the GTP message comprises a time span or an end time of a no-response state.

4. A data sending method comprising:
   acquiring, by a general data transfer platform (GTP) message response device, a time indication of user equipment; and
   sending, by the GTP message response device, a downlink data notification acknowledgment message that carries the time indication of the user equipment to a GTP message sending device that monitors the time indication to determine a time of sending a GTP message to the user equipment,
   wherein the time indication provides information about a change in a time period of an idle state or an ending time of an energy saving state of the user equipment, to enable the GTP message sending device to adjust the time of sending the GTP message in response to changes in the time period, so as to avoid sending the GTP message before the expiration of the time period when the user equipment is in the idle state or the ending time of the energy saving state.

5. The data sending method according to claim 4, wherein, before ending the time of sending the GTP message, stopping the sending of the GTP message by the GTP message sending device.

6. A general data transfer platform (GTP) message sending device comprising:
   a processor;
   a receiver configured to cooperate with the processor to receive a downlink data notification acknowledgment message carrying a time indication of user equipment from a GTP message response device, wherein the time indication provides information about a change in a time period of an idle state or an ending time of an energy saving state of the user equipment; and
   the processor configured to provide the following:
   monitor the time indication to determine a time of sending the GTP message to the user equipment; and
   adjust the time of sending the GTP message in response to changes in the time period, so as to avoid sending the GTP message before expiration of the time period when the user equipment is in the idle state or the ending time of the energy saving state.

7. The GTP message sending device according to claim 6, wherein the processor is configured to stop sending the GTP message before ending the time of sending the GTP message.

8. The GTP message sending device according to claim 6, wherein the time of sending the GTP message comprises a time span or an end time of a no-response state.

9. A general data transfer platform (GTP) message response device comprising:
   a processor;
   a receiver configured to cooperate with the processor to acquire a time indication of user equipment; and
   a transmitter configured to cooperate with the processor to send a downlink data notification acknowledgment message that carries the time indication of the user equipment acquired by the receiver to a GTP message sending device that monitors the time indication to determine a time of sending a GTP message to the user equipment,
   wherein the time indication provides information about a change in a time period when of an idle state or an ending time of an energy saving state of the user equipment, to enable the GTP message sending device to adjust the time of sending the GTP message in response to changes in the time period, so as to avoid sending the GTP message before the expiration of the time period when the user equipment is in the idle state or the ending time of the energy saving state.

10. The GTP message response device according to claim 9, wherein, before ending the time of sending the GTP message, stopping the sending of the GTP message by the GTP message sending device.

11. A non-transitory machine-readable medium having stored thereon, a computer program comprising at least one code section for distributing data, the at least one code section being executable by a general data transfer platform (GTP) message sending device for causing the GTP message sending device to perform acts of:

receiving a downlink data notification acknowledgment message carrying a time indication of user equipment from a GTP message response device, wherein the time indication provides information about a change in a time period of an idle state or an ending time of an energy saving state of the user equipment, including changes in the time period;

monitoring the time indication to determine a time of sending the GTP message to the user equipment; and adjusting the time of sending the GTP message in response to changes in the time period so as to avoid sending the GTP message before expiration of the time period when the user equipment is in the idle state or the ending time of the energy saving state, where the GTP message response and sending devices are not the user equipment.

12. The non-transitory machine-readable medium according to claim 11, wherein the at least one code section being executable by the GTP message sending device for causing the GTP message sending device to perform the acts of adjusting the time of sending the GTP message comprises: before the time of sending the GTP message is ended, stopping the sending of the GTP message.

13. A non-transitory machine-readable medium having stored thereon, a computer program comprising at least one code section for distributing data, the at least one code section being executable by a general data transfer platform (GTP) message response device for causing the GTP message response device to perform acts of:

acquiring a time indication of user equipment; and sending a downlink data notification acknowledgment message that carries the time indication of the user equipment to a GTP message sending device that monitors the time indication to determine a time of sending a GTP message to the user equipment, wherein the time indication provides information about a change in a time period of an idle state or an ending time of an energy saving state of the user equipment, to enable the GTP message sending device to adjust the time of sending the GTP message in response to changes in the time period, so as to avoid sending the GTP message before the expiration of the time period when the user equipment is in the idle state or the ending time of the energy saving state.

14. The non-transitory machine-readable medium according to claim 13, wherein, before the time of sending the GTP message is ended, the sending of the GTP message is stopped by the GTP message sending device.

15. The non-transitory machine-readable medium according to claim 11, wherein the time of sending the GTP message comprises a time span or an end time of a no-response state.

* * * * *